US010382214B2

(12) United States Patent
Decugis

(10) Patent No.: US 10,382,214 B2
(45) Date of Patent: Aug. 13, 2019

(54) AUTHENTICATION CHAINING BY CONNECTED DEVICES

(71) Applicant: INSIDE SECURE, Meyreuil (FR)

(72) Inventor: Sebastien Decugis, La Roque D'Antheron (FR)

(73) Assignee: INSIDE SECURE, Meyreuil (FR)

( * ) Notice: Subject to any disclaimer, the term of this patent is extended or adjusted under 35 U.S.C. 154(b) by 0 days.

(21) Appl. No.: 15/710,137

(22) Filed: Sep. 20, 2017

(65) Prior Publication Data

US 2018/0027147 A1 Jan. 25, 2018

Related U.S. Application Data

(63) Continuation of application No. PCT/FR2016/050597, filed on Mar. 17, 2016.

(30) Foreign Application Priority Data

Mar. 20, 2015 (FR) ........................................ 1552306

(51) Int. Cl.
*B41J 2/175* (2006.01)
*H04L 9/14* (2006.01)
*H04L 9/30* (2006.01)
*H04L 9/32* (2006.01)
(Continued)

(52) U.S. Cl.
CPC ........ *H04L 9/3271* (2013.01); *B41J 2/17543* (2013.01); *H04L 9/14* (2013.01); *H04L 9/30* (2013.01); *H04L 9/3263* (2013.01); *H04N 1/32122* (2013.01); *H04N 1/4433* (2013.01); *H04N 1/32598* (2013.01); *H04N 2201/0082* (2013.01); *H04N 2201/3205* (2013.01)

(58) Field of Classification Search
CPC .......... B41J 2/17543; H04L 9/14; H04L 9/30; H04L 9/3271; H04L 9/3263
See application file for complete search history.

(56) References Cited

U.S. PATENT DOCUMENTS 8,151,108 B1 * 4/2012 Vantalon ............. H04L 63/0823
380/285
8,977,847 B1 3/2015 Juels
2006/0224889 A1 10/2006 Adkins et al.
(Continued)

OTHER PUBLICATIONS

International Search Report with English Translation and Written Opinion for PCT Application PCT/FR2016/050597, dated May 3, 2016, 12 pages.

*Primary Examiner* — Kristal Feggins
*Assistant Examiner* — Kendrick X Liu
(74) *Attorney, Agent, or Firm* — Brake Hughes Bellermann LLP

(57) ABSTRACT

In a general aspect, a method for authenticating a plurality of slave devices connected to a master device can include: generating and sending by the master device a respective challenge to each slave device; in each slave device, generating a response to the respective challenge and transmitting it to the master device; verifying by the master device the response of one of the slave devices; returning by the master device the remaining responses to respective slave devices distinct from those that generated the responses; and verifying by each slave device the response returned thereto by the master device and transmitting the result of the verification to the master device.

4 Claims, 2 Drawing Sheets

(51) Int. Cl.
*H04N 1/32* (2006.01)
*H04N 1/44* (2006.01)

(56) References Cited

U.S. PATENT DOCUMENTS

| | | |
|---|---|---|
| 2011/0145900 A1 | 6/2011 | Chern et al. |
| 2015/0048684 A1* | 2/2015 | Rooyakkers .......... H04L 9/3263 |
| | | 307/65 |
| 2015/0089630 A1* | 3/2015 | Lee ....................... G06F 21/44 |
| | | 726/16 |

\* cited by examiner

Fig 1
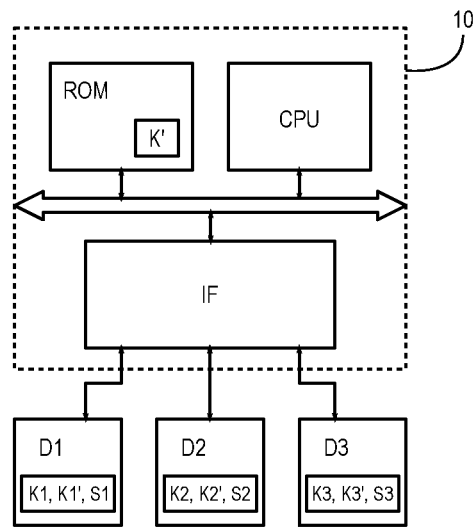
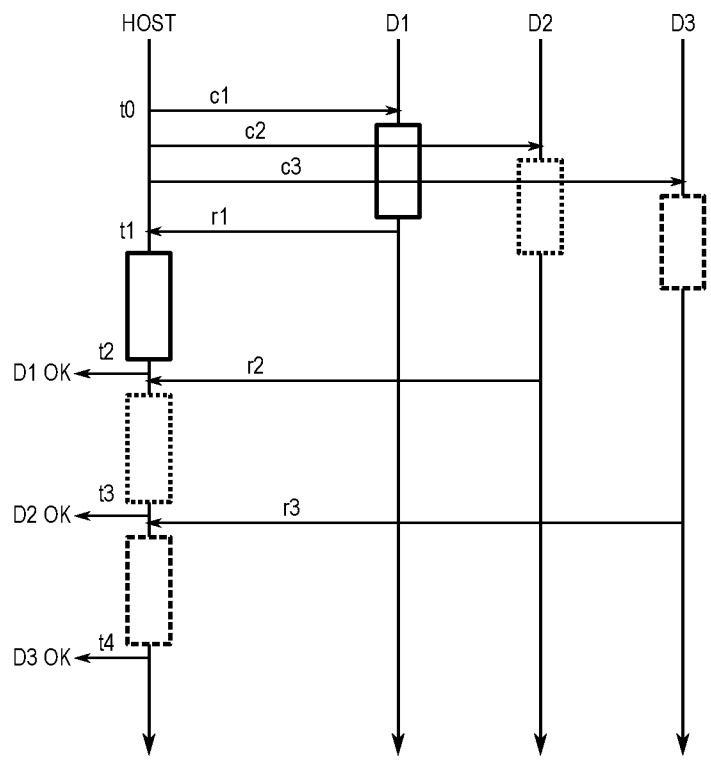
Fig 2

AUTHENTICATION CHAINING BY CONNECTED DEVICES

CROSS REFERENCE TO RELATED APPLICATIONS

This application is a continuation of PCT Application No. PCT/FR2016/050597, filed Mar. 17, 2016, and also claims priority to French Patent Application No. FR15 52306, filed on Mar. 20, 2015, the disclosures of which are incorporated herein by reference in their entireties.

FIELD

This disclosure relates to techniques for authenticating interconnected electronic devices.

BACKGROUND

Certain apparatuses are designed to be equipped with removable devices such as peripherals or consumables. In certain situations, for reasons of safety or quality of service, the apparatus manufacturer may want the removable devices to be supplied by an authorized source and refuse to use a removable device of unknown origin. Such a situation is, for example, that of a printer and its ink cartridges.

SUMMARY

A method is generally provided for authenticating a plurality of slave devices connected to a master device, where the method can include generating and sending, by the master device, a respective challenge to each slave device; in each slave device, generating a response to the respective challenge and transmitting it to the master device; verifying by the master device the response of one of the slave devices; returning by the master device the remaining responses to respective slave devices distinct from those that generated the responses; and verifying, by each slave device, the response returned thereto by the master device and transmitting the result of the verification to the master device.

The method can include returning, by the master device, the response of the slave device of rank i to the slave device of rank i+1, where i varies from 1 to N−1, and N is the number of slave devices; verifying, by the master device, the response of the slave device of rank N; if the response verified by the master device is valid, authenticating the slave device of rank N; and if the answer verified by a device of rank j is valid, authenticating the device of rank j−1, where j decreases from N to 2.

The master device may be a printer and the slave devices may be ink cartridges.

To carry out the method, a consumable device authenticatable by a master apparatus through a challenge-response mechanism may include a microcircuit configured to perform cryptographic operations and be programmed (configured, etc.) to perform a verification of a response generated to a challenge by another device.

The consumable device may store a key for authenticating the device itself, and a key for verifying the response generated by the other device.

The consumable device may be an ink cartridge that can be authenticated by a printer.

BRIEF DESCRIPTION OF DRAWINGS

Other advantages and features will become more clearly apparent from the following description of particular embodiments, which are provided for exemplary purposes only and represented in the appended drawings, in which:

FIG. 1, is an electronic circuit diagram of an apparatus connected to a plurality of peripheral devices, in accordance with an implementation;

FIG. 2 is a timing diagram illustrating an authentication sequence for a plurality of peripheral devices, in accordance with an implementation.

DETAILED DESCRIPTION

Figure 3:
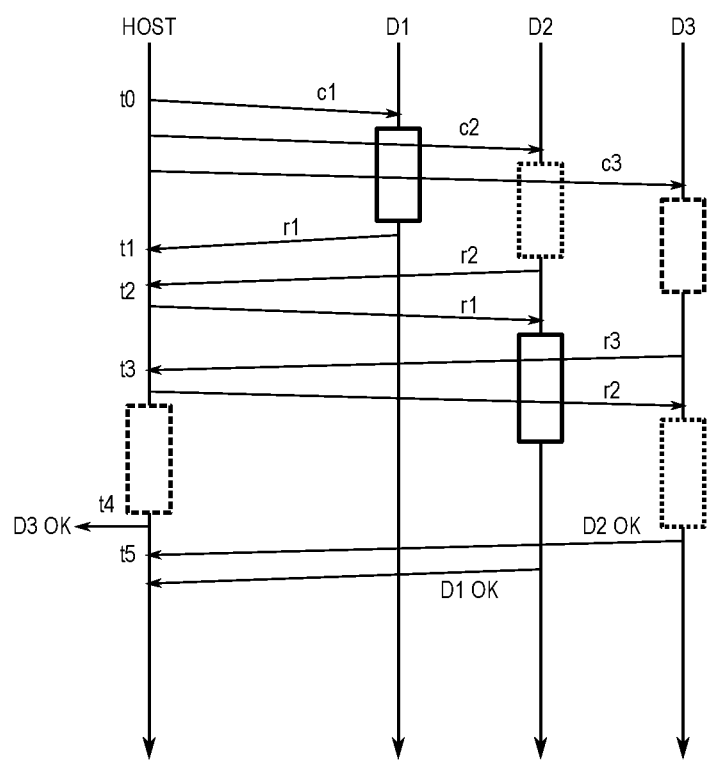
FIG. 3 is a timing diagram illustrating an implementation of a chained authentication of several peripheral devices, in accordance with an implementation.

Apparatuses and methods are described herein, where an apparatus (e.g., a printer) may authenticate one or more removable devices (e.g., ink cartridges) that are installed in (coupled with, etc.) the apparatus. In implementations, such apparatuses and removable devices may each include a cryptographic circuit that use one or more certificates of authenticity. The apparatus can then authenticate (e.g., direct authentication of) each of the removable devices upon power-up, and take preventive measures with devices whose authentication fails.

FIG. 1 is an electronic block diagram of an apparatus 10 connected to a plurality of peripheral devices D1 to D3. The apparatus 10 may be a printer and the devices D1-D3 may be ink cartridges of different colors that are usable simultaneously. The apparatus 10 may include a processor CPU connected to memories and interfaces via a bus B. A read-only memory ROM may contain a key K' for authentication operations. This key K' may be the public key for (corresponding with) a master private key K of a manufacturer of the devices D1 to D3, for example. An interface IF may be designed to communicate with the devices D1 to D3. Each peripheral device to be authenticated may contain a respective private key K1 to K3, the corresponding respective public key K1' to K3', and a proof of authenticity of the public key, or certificate of authenticity, in the form of a respective signature S1 to S3 of the public key by the master key K.

Since such authentication operations can be relatively complex, they may be particularly time consuming if the number of devices to be authenticated is large and the computing resources of the apparatus are limited. The approaches described herein can be used to reduce an amount of time and/or computing resources used (e.g., by a master device) for authenticating such peripheral devices as compared to prior approaches.

FIG. 2 is a timing diagram illustrating an authentication procedure that can be implemented in an apparatus, such as the apparatus of FIG. 1, upon power-up. Operations performed by a host processor (HOST) of the apparatus and by the peripheral devices D1-D3 to be authenticated are indicated on respective vertical axes, in the form of rectangles having lengths that are illustrative of the durations of the operations. The rectangles are also drawn with different line types to differentiate the operations associated with the various peripheral devices. Communications between the elements are represented by horizontal arrows.

From a time t0, a program (e.g., implemented using software, firmware and/or hardware) executed by the host starts an authentication procedure of the peripheral devices D1 to D3. The host generates a respective challenge c1 to c3 for each of the devices D1 to D3. The challenges may be different and consist of random numbers of standardized size. The challenges c1 to c3 are transmitted sequentially to the devices D1 to D3, and then the host waits for the availability of the responses from the devices D1 to D3.

Each of the devices D1 to D3 calculates a respective response r1 to r3 to the challenge received according to a mechanism that may be standardized. Each of these responses includes, for example, a signature calculated on the challenge received, a response challenge, and an identifier, using respective secret keys K1 to K3 contained in the devices D1 to D3. The calculated responses may be stored by the devices D1 to D3, awaiting their reading by the host.

From a time t1, the host reads the response r1 of the device D1 and verifies its validity. This verification may include, for example, authenticating the signature conveyed in the response using the public key K1' of the device, authenticating the public key K1' using the device's certificate S1, and authenticating the certificate S1 using the public key K' known to the host.

In practice, the host may periodically poll the device D1 from the time t0 to check for the availability of the response r1. If the response is not ready in a current poll, the poll is reiterated. If the response is ready, it is read and the host proceeds with verification of the device D1.

From a time t2, the host has completed the verification of the response r1. If the response r1 is valid, the host may register (indicate) that the device D1 is authentic (e.g., D1 OK). The host then reads the response r2 produced by the next device D2, and proceeds to check (verify) this response.

From a time t3, the host has completed the verification of the response r2. If the response r2 is valid, the host may register (indicate) that the device D2 is authentic (e.g., D2 OK). The host then reads the response r3 produced by the last device D3, and proceeds to check this response.

Finally, at a time t4, the host has completed the verification of the response r3. If the response r3 is valid, the host may register (indicate) that the last device D3 is authentic (D3 OK).

If the verification fails for any of the devices D1 to D3, various measures may be taken depending on the context and nature of the failing device, ranging from the degraded operation of the apparatus without the failing device, to total refusal to operate.

The signature calculations used to generate and verify responses can include relatively complex cryptographic calculations on large numbers up to several hundred bits. The host system may be embedded and of low cost, with limited computing resources, which can be the case for certain printers (or other apparatuses). In this case, the involved verification operations, proportional to the number of devices to be authenticated (for example eight cartridges in certain printers), can reach a duration of several seconds, which may be prohibitive for a power-up phase of the apparatus.

As shown in FIG. 2, each device to be authenticated can be configured to generate responses to the challenges received on the basis of a local secret key and, therefore, can implement cryptographic functions to generate those responses. Such cryptographic functions can be provided, for example, by an inexpensive dedicated microcircuit, having a microcontroller associated with a hardware accelerator, or coprocessor dedicated to cryptographic functions. Even though such a microcontroller may have less computing power than the host processor, the coprocessor performance can be such that it can compute signatures at least as fast as the host processor.

In order to further accelerate the authentication phase of several devices, computing resources of dedicated microcircuits of peripheral devices can be used to perform (carry out, implement, etc.) one or more authentication operations for the host processor (e.g., for the device 10 in FIG. 1). For instance, rather than a host processor performing verification (authentication) for each peripheral device, approaches described herein can include the distribution (delegation, etc.) of verification (authentication) operations on (across) one or more peripheral devices that may be (at least initially) of an unknown source (type, manufacturer, etc.). Such approaches can further include establishing a chain of trust that ensures that any verification results taken into account (e.g., by a host processor) are produced by devices (e.g., peripheral devices) which have themselves been authenticated.

FIG. 3 is a timing diagram illustrating an exemplary implementation of such a chained and distributed authentication process (method, phase, etc.). For purposes of illustration and clarity, FIG. 3 is illustrated and described using the same context and notations as used in, and with respect to FIG. 2.

In FIG. 3, from a time t0, as in FIG. 2, a program executed by the host starts an authentication procedure of the peripheral devices D1 to D3. The host generates respective challenges c1 to c3 for each of the devices D1 to D3. The challenges c1 to c3 are transmitted sequentially to the devices D1 to D3, and then the host waits for the availability of the responses.

As in FIG. 2, each of the devices D1 to D3 calculates a response r1 to r3 to the respective challenge received. These responses may be stored by the devices, awaiting their reading by the host.

From a time t1, the host reads the response r1 of the device D1. Instead of initiating a verification calculation of the response, the response r1 is put on hold, awaiting the availability of another of the devices, for example D2.

At a time t2, the host reads the response r2 produced by the device D2. This reading implies that the device D2 is available. The host immediately transfers the response r1 to the device D2 for the latter to carry out verification. The response r2 is put on hold, awaiting the availability of another of the devices, here D3.

The verification of the device D1 from the response r1 that is performed by the device D2 can be done in the same way as it would be in the host. The result of the verification is stored temporarily in the device D2 to be read by the host in due course.

Thus, the peripheral device can be configured to contain the public key K' (e.g., of the host device) in addition to its keys K2 and K2', and to perform verification operations. The verification operations may be implemented by a modification of the microcircuit's program (e.g., a response generation program). The response transferred by the host may be included in a message identifying the nature of the operations to be performed by the peripheral device.

At a time t3, the host reads the response r3 produced by the device D3. This reading implies that the device D3 is available. The host immediately transfers the response r2 to the device D3 for the latter to carry out verification of the device D2.

To start a chain of trust, the host verifies the response r3 of the (last) device D3. As shown, the verification of the response r3 by the host is carried out substantially in parallel, or during overlapping time periods, with the verification of the responses r1 and r2 by, respectively, the devices D2 and D3.

A total duration of the authentication phase can, be reduced as compared to serial verification by the host. For instance the total duration of the authentication phase can be equal (substantially equal) to a longest duration of a verification of, in this example, the peripheral devices D1 (by D2), D2 (by D3) and D3 (by the host), plus time of transfers of responses and results between the host and the devices D1 to D3.

At a time t4, the host has finished verifying the response r3 and, in such implementations, determines that the device D3 is authentic (e.g., D3 OK).

At a time t5, the host reads the verification result D2 OK produced by the device D3. Since the device D3 has been authenticated, the host can trust the verification result that it produces. This result, in such implementations, authenticates the device D2.

Finally, the host reads the verification result D1 OK produced by the device D2. Since the device D2 has been authenticated, the host can trust the verification result it produces, and this result, in such implementations, authenticates the device D1.

Thus, each of the devices D3 to D1 is authenticated, in turn, by the host or by a device which has itself been authenticated according to a chain of trust starting from the host.

A rogue device could be designed to always provide the host with a valid verification result. But such attempts would be thwarted by the fact that the rogue device would be detected as non-authentic (would not be verified) upon the verification of its response to a challenge, which would be verified by another authenticated device, or by the host. Thus, the result produced by the rogue device would not be taken into account. Moreover, the result produced by the rogue device would relate to another device, and not to the rogue device itself.

One pass of the method makes it possible to identify a first (if any) non-authentic devices of the chain. If a non-authentic device is identified, that pass may then be stopped, since authentication of the next devices in the chain may be compromised. In the example of FIG. 3, if the device D3 is not authentic, this is detected by the host. The host may then distrust the device D3 as to the result it provides for the device D2, and so on.

If it is desired to detect all non-authentic devices, several passes of the method may be carried out, starting the chain of trust with a different device each time. Moreover, in order to thwart certain types of attacks, the first pass may further be designed to start the chain on a different device each time, for example, on a device chosen randomly.

The approaches described herein can be used with any number of interconnected devices. In general, one master device may be designated to authenticate N slave devices. In such implementations, the master device can return a response of a slave device of rank i to a slave device of rank i+1, where i varies from 1 to N−1, and the master device can verify a response of a slave device of rank N. If the answer (response) verified by the master device is valid, the slave device of rank N is determined as being authentic. Then, for j decreasing from N to 2, if the answer verified by the device of rank j is valid, the device of rank j−1 is determined as being authentic.

The approaches described herein may be used in many types of apparatus (master devices) using consumable devices (slaves). A printer and its ink cartridges were cited. Other examples can include a hot beverage machine and its refills, a tracing table and its pens, a parameter management system and its sensors, etc.

The invention claimed is:

1. A method for authenticating a plurality of slave devices connected to a master device, the method comprising:
   generating and sending, by the master device, a respective challenge to each slave device of the plurality of slave devices;
   in each slave device of the plurality of slave devices, generating a respective response to the respective challenge and transmitting the respective response to the master device;
   for each slave device of rank i, where i varies from 1 to N−1, N being a number of slave devices, sending, by the master device, a respective response of a slave device of rank i to a slave device of rank i+1;
   verifying, by the master device, the respective response of a slave device of rank N;
   if the respective response verified by the master device is valid, authenticating the slave device of rank N; and
   if a result of the verification of the respective response verified by a slave device of rank j is valid, authenticating a slave device of rank j−1, where j decreases from N to 2.

2. The method of claim 1, wherein the master device is a printer and the slave devices are ink cartridges.

3. A method for authenticating a plurality of ink cartridges connected to a printer, the method comprising:
   generating and sending, by the printer, a respective challenge to each ink cartridge of the plurality of ink cartridges;
   in each ink cartridge of the plurality of ink cartridges, generating a respective response to the respective challenge and transmitting the respective response to the printer;
   verifying, by the printer, the respective response of one of the ink cartridges;
   for each of the respective responses other than the respective response verified by the printer, sending, by the printer, the respective response of a respective ink cartridge to an ink cartridge distinct from the respective ink cartridge that generated the respective response; and
   verifying, by each ink cartridge, the respective response sent thereto by the printer and transmitting a result of the verification to the printer.

4. A method for authenticating a plurality of consumable devices connected to an apparatus, the method comprising:
   generating and sending, by the apparatus, a respective challenge to each consumable device of the plurality of consumable devices;
   in each consumable device of the plurality of consumable devices, generating a respective response to the respective challenge and transmitting the respective response to the apparatus;
   verifying, by the apparatus, the respective response of one of the consumable devices;
   for each of the respective responses other than the respective response verified by the apparatus, sending, by the apparatus, the respective response of a respective consumable device to a consumable device distinct from the respective consumable device that generated the respective response; and
   verifying, by each consumable device, the respective response returned sent thereto by the apparatus and transmitting a result of the verification to the apparatus.

* * * * *

UNITED STATES PATENT AND TRADEMARK OFFICE
CERTIFICATE OF CORRECTION

PATENT NO. : 10,382,214 B2  
APPLICATION NO. : 15/710137  
DATED : August 13, 2019  
INVENTOR(S) : Decugis Page 1 of 1

It is certified that error appears in the above-identified patent and that said Letters Patent is hereby corrected as shown below:

In the Claims

In Column 6, Claim 4, Line 62, delete "returned sent" and insert -- sent --, therefor.

Signed and Sealed this  
Twenty-ninth Day of October, 2019

Andrei Iancu  
*Director of the United States Patent and Trademark Office*